United States Patent
Casagrande

(10) Patent No.: US 6,778,284 B2
(45) Date of Patent: Aug. 17, 2004

(54) APPARATUS FOR MEASURING THE CHARACTERISTIC PARAMETERS OF AN OVERHEAD RAILWAY OR TRAMING LINE

(75) Inventor: Ettore Casagrande, Badoere di Morgano (IT)

(73) Assignee: Tecnogamma, S.p.A., Badoere di Morgano (IT)

( * ) Notice: Subject to any disclaimer, the term of this patent is extended or adjusted under 35 U.S.C. 154(b) by 0 days.

(21) Appl. No.: 10/275,951

(22) PCT Filed: Jul. 13, 2001

(86) PCT No.: PCT/EP01/08117

§ 371 (c)(1), (2), (4) Date: Nov. 15, 2002

(87) PCT Pub. No.: WO02/06077

PCT Pub. Date: Jan. 24, 2002

(65) Prior Publication Data

US 2003/0142297 A1 Jul. 31, 2003

(30) Foreign Application Priority Data

Jul. 18, 2000 (IT) ..................................... VE2000A0036

(51) Int. Cl.[7] .............................................. G01B 11/00
(52) U.S. Cl. ...................................... 356/614; 356/622
(58) Field of Search ............................... 356/614, 615, 356/622, 623, 625, 629, 630, 635–637, 237.1, 237.2; 250/553, 202.2

(56) References Cited

U.S. PATENT DOCUMENTS

| | | | | |
|---|---|---|---|---|
| 4,181,430 A | * | 1/1980 | Shirota et al. | 356/3.06 |
| 4,198,164 A | * | 4/1980 | Cantor | 356/623 |
| 4,531,837 A | * | 7/1985 | Panetti | 356/608 |
| 4,801,207 A | * | 1/1989 | Williams | 356/606 |
| 4,915,504 A | * | 4/1990 | Thurston | 356/604 |
| 5,930,904 A | | 8/1999 | Mualem | |

FOREIGN PATENT DOCUMENTS

| | | | |
|---|---|---|---|
| EP | 668 185 A1 | | 2/1995 |
| EP | 0 789 258 A1 | * | 8/1997 |
| JP | 31-56303 | | 7/1991 |
| JP | 4-19503 | * | 1/1992 |
| JP | 5-34113 | * | 2/1993 |
| JP | 6-258030 | * | 9/1994 |
| JP | 71-20227 | | 5/1995 |

* cited by examiner

Primary Examiner—Michael P. Stafira
(74) Attorney, Agent, or Firm—Hoffman, Wasson & Gitler

(57) ABSTRACT

An apparatus for measuring the characteristic parameters of an overhead railway or tramway line, characterized by comprising, on board a railway or tramway vehicle (25):

at least one laser source (2) for generating a laser beam, optical means for transforming said laser beam, generated by said soruce (2), into a flat beam (4), means for orientating the axis of said flat beam (4) at an angle other than 90° to the axis of the overhead line wire (6) and defining with this latter a plane substantially perpendicular to the plane of said beam (4), at least one video camera (8) having its optical axis different from the axis of said flat beam but lying in said perpendicular plane and orientated towards the light-emitting line of intersection of said laser beam (4) with said wire (6), the apparatus also comprising a processing unit for the signals generated by said video camera (8) in order to determine the position of said light-emitting line within the optical field of said video camera (8), and to effect reconstruction of the real profile of said wire (6) and its comparison with the theoretical profile of the wire itself.

19 Claims, 4 Drawing Sheets

APPARATUS FOR MEASURING THE CHARACTERISTIC PARAMETERS OF AN OVERHEAD RAILWAY OR TRAMING LINE

This invention relates to an apparatus for measuring the characteristic parameters of an overhead railway or tramway line.

BACKGROUND OF THE INVENTION

Overhead railway or tramway lines comprise one, or more often two, side-by-side electrically powered wires of convenient diameter supported by a plurality of poles disposed along the track at a predetermined height therefrom, to enable a pantograph mounted on the locomotive of the railway or tramway train to slide along the wires and withdraw therefrom the electrical energy required for powering the traction motor and the services.

For efficiency reasons, the overhead line has to be carefully monitored periodically, by measuring its characteristic parameters consisting essentially of its wear, its height and the movement of its wires.

A knowledge of the degree of wire wear is important to prevent its diameter falling below predetermined limiting values, which could result in breakage of the cable subjected to continuous stress by the pantograph.

A knowledge of the wire height, i.e. its distance from the track plane measured in a vertical direction, is important to ensure that height variations do not exceed a predetermined amount, typically of 1.5 m.

A knowledge of the wire movement, i.e. its distance from the track axis measured in a horizontal direction, is important to ensure that its variations do not exceed a predetermined amount, typically of 0.6 m.

The parameters of an overhead railway or tramway line are currently determined by a series of measurements made by a sampling guage.

Such a measurement system is evidently extremely unsatisfactory in that it involves in particular:

- extreme operational slowness because of the need to use manual sampling,
- likewise extreme operational discomfort, because of the need to make a manual measurement, after firstly halting the measurement train each time this measurement is to be made,
- only few parameters are measured,
- an inevitable while at the same time unacceptable location of the measurements at points often distant from each other and not necessarily coinciding with the points of effective maximum wear, which are in fact those responsible for wire breakage as a result of stressing by the pantograph.

BRIEF SUMMARY OF THE INVENTION

An object of the invention is to measure several parameters significant of the effective conditions of the overhead line.

Another object of the invention is to make this measurement in an extremely rapid and comfortable manner.

A further object of the invention is to effect this measurement practically continuously along the entire overhead line.

All these and further objects which will be apparent from the ensuing description are attained according to the invention by an apparatus for measuring the characteristic parameters of an overhead railway or tramway line as described in claim 1.

BRIEF DESCRIPTION OF THE DRAWINGS

Some preferred embodiments of the invention are described in detail hereinafter with reference to the accompanying drawings, in which.

DETAILED DESCRIPTION OF THE INVENTION

Figure 1:
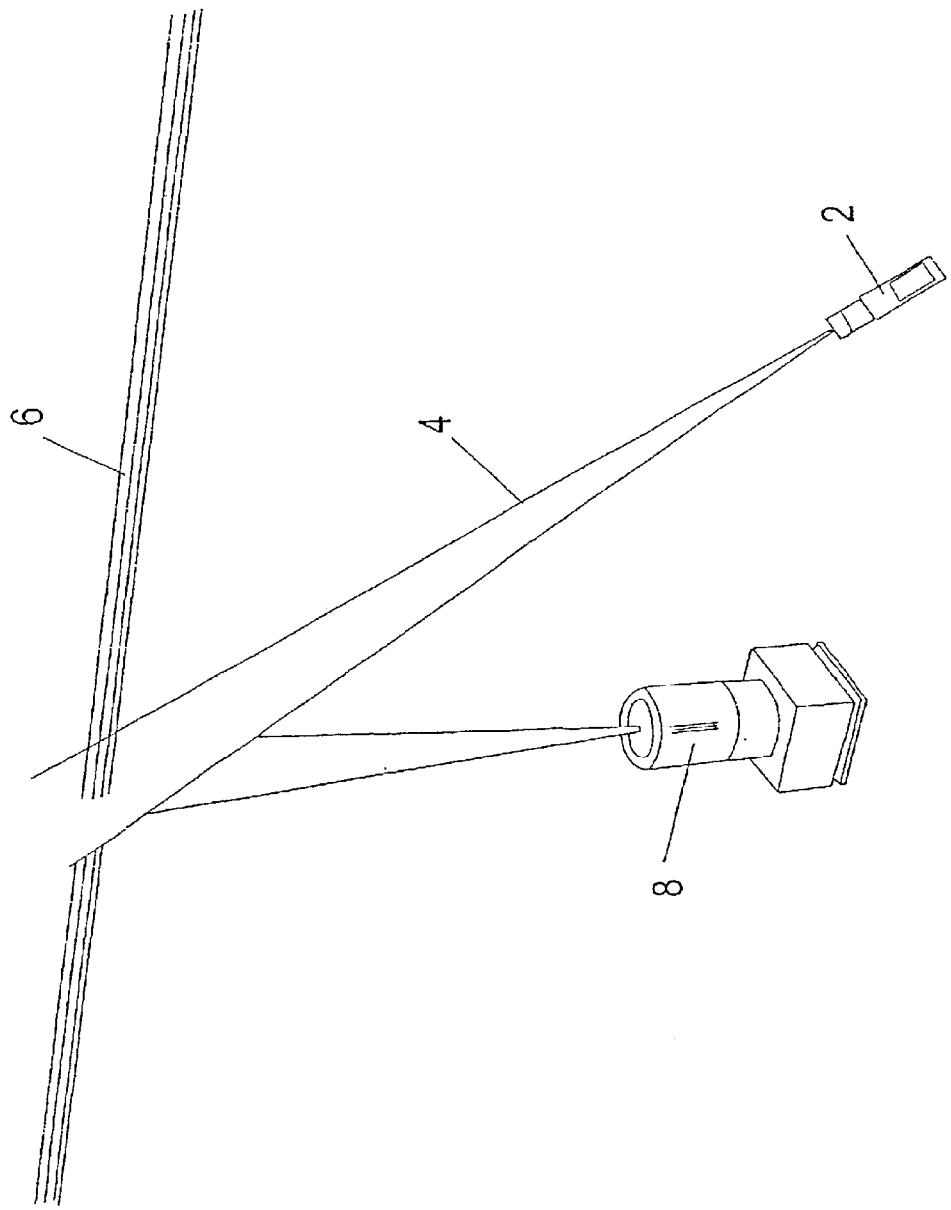
FIG. 1 schematically indicates the general principle on which the apparatus of the invention is based.

As can be seen from the figures, the apparatus of the invention is installed on board a rail vehicle and is based on the principle of laser triangulation. For this purpose it comprises a solid state laser source able to emit a laser beam 4 which is initially collimated and is then expanded to assume a flat form, preferably of the order of 0.2 mm thick. The collimated beam is advantageously expanded by a cylindrical lens formed such as to compensate the gaussian distribution of the laser beam intensity and obtain a uniform intensity.

The laser beam obtained in this manner is projected onto the underside of the wire 6 of the overhead line at an angle of about 45° to its axis. In this description, reference is always made to a single wire 6, although in practice an overhead line comprises more than one wire.

The interference of the wire 6 with the laser beam 4 determines on the wire a light-emitting line, the pattern and position of which are related to the wire profile and hence vary as this varies, in particular as a result of wear, deformation and movement.

In a position below the wire 6 there is located a solid state video camera 8 of high resolution and high acquisition frequency; its optical axis is substantially perpendicular to the axis of the wire 6 and is therefore able to survey the light-emitting line generated by the laser beam on the wire. The data relative to the line, in the form of Cartesian coordinates of every acquired point thereof, are transferred to a processor unit which calculates the real profile of the lower part of the wire, by interpolating between the plurality of points acquired by the sensor of the video camera 8.

The processor unit is also able to determine the position of the light-emitting line which appears in the optical field of the video camera 8 and to calculate therefrom the horizontal movement of the wire relative to the axis of the track 10, and its height variations relative to the plane of the track. More particularly, if for a given height of the wire 6 the light-emitting line is located on the optical axis of the video camera 8 and its image falls at the centre of the optical field thereof, for a slightly different height of the wire 6 the light-emitting line will be displaced from said optical axis and its image will be displaced longitudinally from the centre of said optical field to an extent related to the height variations of the wire.

Likewise, if for a central position of the wire 6 the image of the light-emitting line falls on the median axis of the optical field of the video camera 8, for a wire position displaced laterally from the preceding the image of the light-emitting line on the video camera will be displaced transversely from said median line to an extent related to said displacement.

The video camera 8 is provided with a particular high-selectivity interferential optical filter, able to allow only the laser wavelength to pass and to block all other wavelengths, in order to render the system immune from interference caused by sunlight or by other light sourcees and to enable the apparatus to be used in any light condition, without the need for any adjustment.

Using the sampling frequency allowed by the video camera 8 (for example 1000/sec), the processor unit is able to measure the three characteristic parameters of an overhead railway or tramway line practically continuously.

The processor unit can be installed on board the railway or tramway vehicle for immediate measurement of the wire wear, or can be installed on the ground, in which case the data acquired by the video camera 8 are fed to a recorder unit for their later use. In both cases the apparatus of the invention is preferably equipped with a system for measuring the progressive distance covered, in order to correlate data relative to successive video camera readings with the point on the railway or tramway line at which those data were acquired.

This system preferably consists of an incremental encoder mounted on the axle of a wheel of the railway or tramway vehicle and connected to this wheel by an elastic joint or by a toothed belt drive. In order to compensate possible slippage of the wheels along the rails 10, it is preferable to use four encoders applied to the four wheels of the vehicle and an algorithm which compares the data originating from said encoders and corrects the errors due to this slippage.

Figure 2:
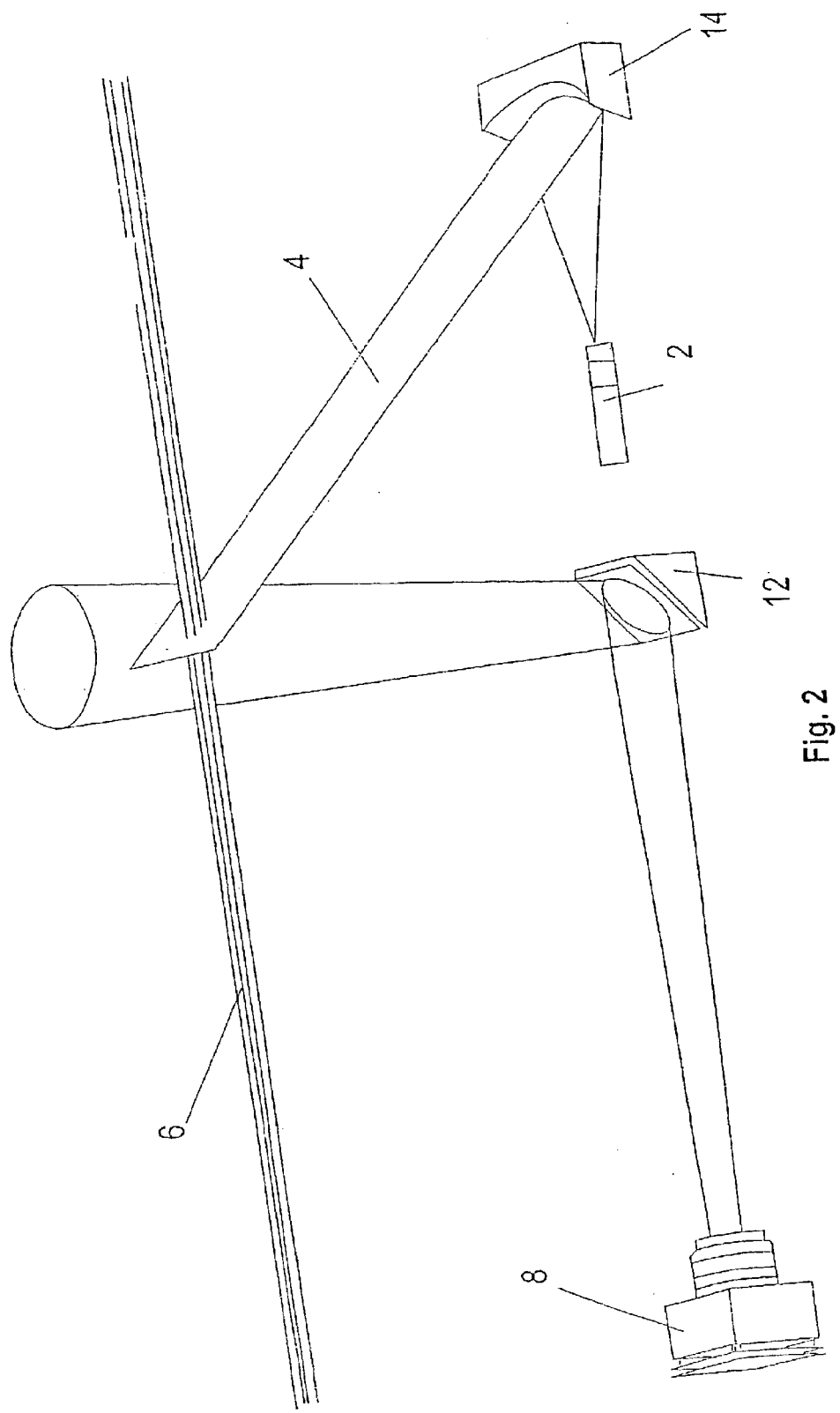
FIG. 2 shows it in that embodiment for measuring larger variations in the height of the wire.

To make the wire measurement system also reliable in the real case of several large variations in the height of the wire 6 in different or in the same overhead railway or tramway line, a more sophisticated apparatus is provided able to adapt automatically to these larger height variations, this apparatus being shown schematically in FIG. 2.

As can be seen, in this apparatus the video camera 8 is positioned, for practical reasons, with its optical axis parallel to the axis of the wire 6, and is faced by a mirror 12 able to reflect onto the video camera sensor the image of the light-emitting line formed by the interference of the laser beam 4 with the wire 6.

The video camera 8 is provided with a suitable lens with the possibility of fixed focus or motorized zoom under the control of the processor unit.

The laser source 2 of this apparatus is coaxial to the video camera 8, a mirror 14 being interposed between them to reflect the laser beam 4 emitted by said source 2 upwards onto the wire 6.

In operation, starting from a condition, attained by manual or automatic sighting in any manner, in which the image of the light-emitting line falls within the optical field of the video camera 8, when the system logic perceives that as a result of variations in the wire height this image of the light-emitting line is about to leave said optical field, it causes the mirror 12 to move in a direction such as to follow this light-emitting line and return its image to within the field of the video camera.

By suitably choosing the system lens perfect focusing and uniformity of light-emitting characteristics can be ensured, even with a height of the wire 6 variable within a range of 2 m.

In order also to extend the measuring range for the third characteristic parameter of an overhead railway or tramway line, i.e. the horizontal movement of the wire 6 relative to the track axis, a movement which can reach as much as 0.6 m, the apparatus of the invention uses a plurality of side-by-side triangulation laser reading units, instead of a single unit.

Figure 3:
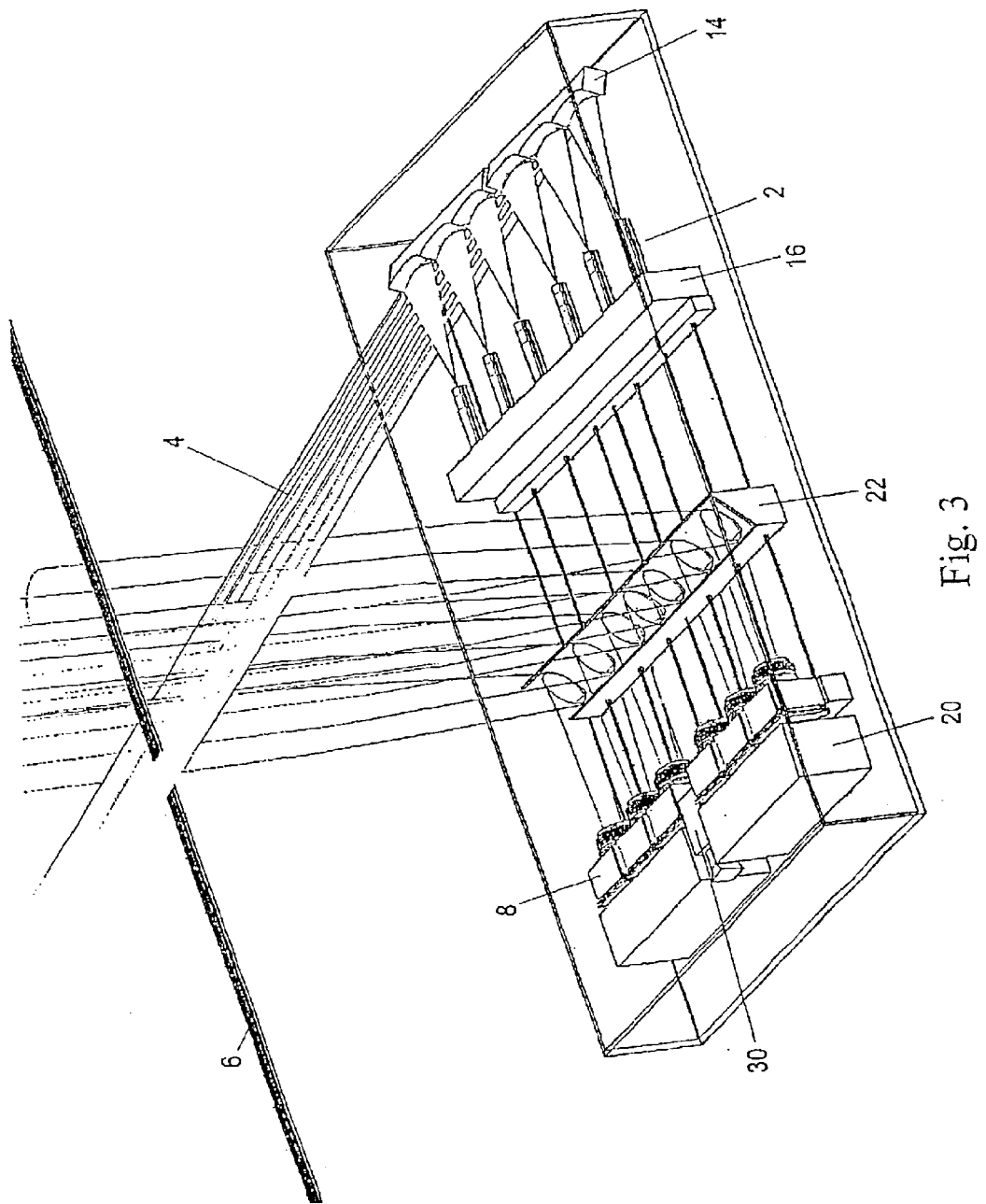
FIG. 3 shows it in its general embodiment.
Figure 4:
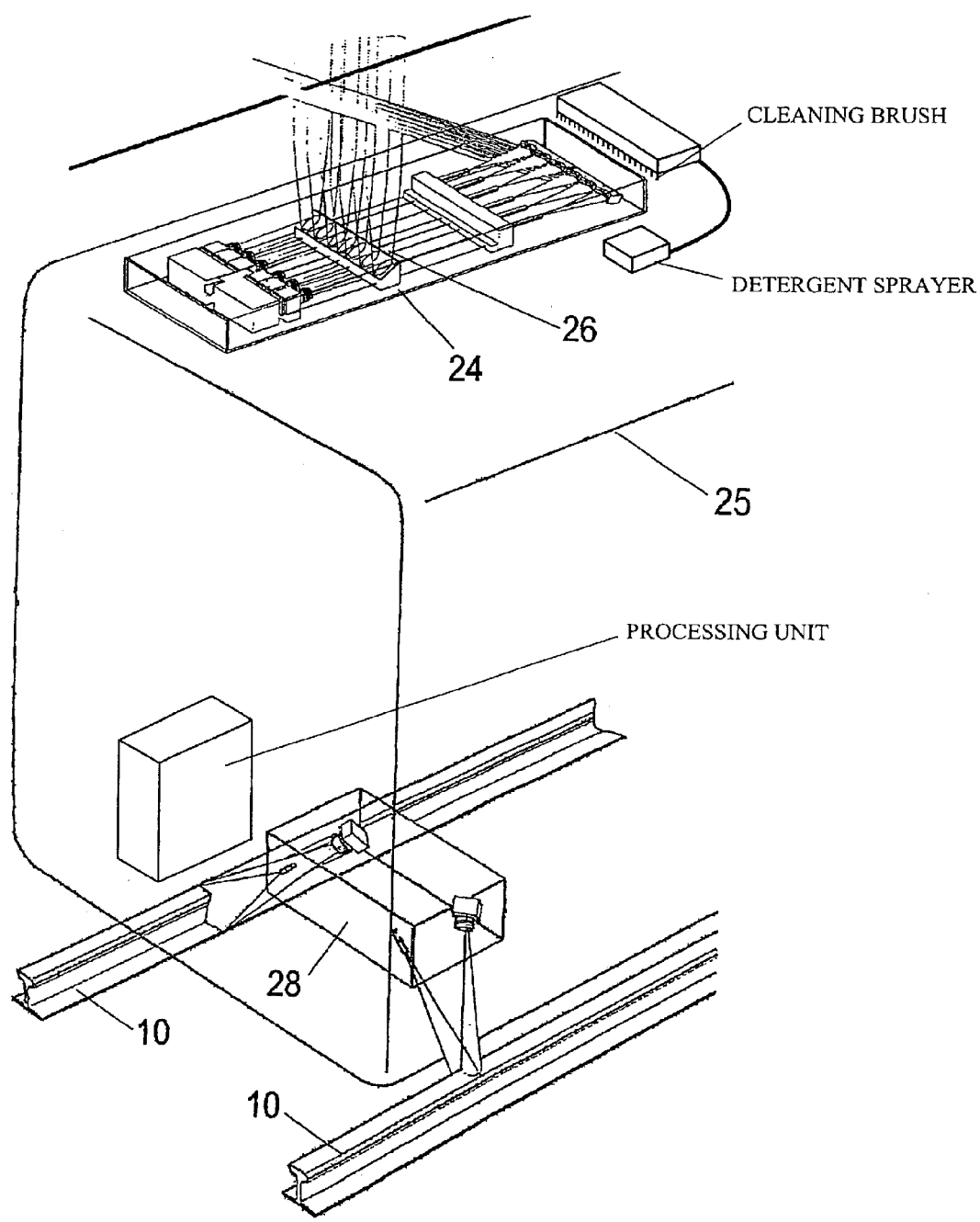
FIG. 4 shows it installed on a railway or tramway vehicle.

FIG. 3 shows an apparatus of this type, in which six laser sources 2 are mounted side by side on a single transverse bar 16 facing a plurality of mirrors 14 mounted inclined to reflect the laser beam 4.

The six laser sources 2 form part of six reading units, each comprising a video camera 8, the six video cameras 8 being mounted side by side on a single transverse bar 20 disposed parallel to the bar 16 of the laser sources 2 and facing a bar 22 comprising six mirrors 12 disposed at 45°, to reflect onto the six video cameras 8 the image of the corresponding light-emitting line formed by the interference of one of the six laser beams 4 with the wire 6 of the overhead line.

The bar 22 is mounted on a carriage which can be driven by a motorized screw for its movement towards and away from said bar 16.

As each reading unit is able to cover a horizontal width of 0.1 m, the assembly of six units is able to cover a total width of 0.6 m, which normally corresponds to the maximum horizontal excursion of the wire 6 in its movement about the track axis.

The assembly formed by the bar 16 of laser sources 2, the movable mirror 14, the bar 20 of video cameras 8 and the bar 22 of fixed mirrors 12 is preferably enclosed within a strong metal container 24, arranged for fixing to the railway or tramway vehicle 25. Sealed glass windows 26 are provided in the container 24 to provide visibility for the video cameras 8 and an exit for the laser beams 4. These windows are preferably associated with electrically driven brushes associated with a series of detergent liquid sprayers to provide automatic cleaning. Furthermore, to prevent the formation of condensate on the windows and on the optical parts of the apparatus, the container 24 is provided with a conditioning system able to maintain its internal temperature automatically constant.

As the container 24 is mounted on the railway or tramway vehicle 25 and the data acquired are influenced by its vertical and horizontal movements and its rocking, a triangulation laser device 28 is also provided on the bottom of the vehicle to measure the geometrical position of said vehicle, in order to automatically compensate the measurement error.

Finally, in addition to the laser triangulation units the apparatus of the invention also comprises a further video camera 30 for video inspection of the overhead line. More particularly, this video camera 30 is of progressive scanning digital type with a servo-controlled zoom lens and can be advantageously mounted on the same bar 20 on which the six video cameras 8 of the six triangulation units are mounted. Likewise a further mirror 32 can be mounted on the same bar 22 as the six mirrors 12 to reflect the image of the overhead line onto the video camera 30.

The images acquired by this video camera 30 are compressed in real time and are then memorized in association with the progressive distance covered.

From the aforegoing it is apparent that the measuring apparatus of the invention is particularly advantageous, and in particular:

- it enables the three characteristic parameters of an overhead railway or tramway line to be measured, and in particular the wear of the wire, its height variations and its displacements about the track axis,
- it enables these parameters to be measured practically continuously,
- it enables these parameters to be measured very comfortably at high operating speed,
- it enables the measured parameters to be correlated with the progressive distance covered, it enables the measurements to be made under any light condition and without any influence by sunlight or by other light sources, the data acquired can be processed in real time, directly on the rail vehicle, or subsequently, it can be integrated with an apparatus for video inspection of the overhead line, it automatically compensates the errors due to vertical or horizontal movements of the railway or tramway vehicle on which it is installed.

What is claimed is:

1. An apparatus for continuously measuring the characteristic parameters of an overhead railway or tramway line, comprising:

a laser source for generating a laser beam, optical means for transforming said laser beam, generated by said source, into a flat beam, means for orientating the axis of said flat beam at an angle other than 90° to the axis of the overhead line and defining with this latter a plan substantially perpendicular to the plane of said beam, a first video camera having its optical axis different from the axis of said flat beam but lying in said perpendicular plane and substantially orientated upwardly towards the light-emitting line of intersection of said laser beam with said overhead line, and a processing unit for the signals generated by said first video camera in order to determine the position of said light-emitting line within the optical field of said video camera, and to effect reconstruction of the real profile of said overhead line and its comparison with the theoretical profile of the overhead line itself.

2. An apparatus as claimed in claim 1, wherein said laser source is a solid state laser source.

3. An apparatus as claimed in claim 1, wherein said optical means comprise an assembly of lenses for collimating said laser beam.

4. An apparatus as claimed in claim 3, wherein said optical means comprise a cylindrical lens for flattening the collimated beam.

5. An apparatus as claimed in claim 2, wherein the axis of the flat beam forms with the axis of said wire an angle between 40° and 50°.

6. An apparatus as claimed in claim 1, wherein said first video camera is of high resolution type.

7. An apparatus as claimed in claim 1, wherein said first video camera is of high acquisition frequency type.

8. An apparatus as claimed in claim 7, wherein said first video camera has sampling frequency of the order of 1000 samplings per second.

9. An apparatus as claimed in claim 1, wherein said first video camera is provided with an interferential optical filter of pass band corresponding to the frequency of said laser source.

10. An apparatus as claimed in claim 2, wherein said first video camera is provided with motorized zoom, said first video camera is faced by a mirror movable on the basis of the height of said wire in such a manner as to ensure that the image of said light-emitting line always falls within the field of said first video camera, said laser source is orientated such that the flat laser beam leaving it is substantially parallel to the axis of said wire, and said laser source is faced by a mirror projecting the laser beam on the wire, the motorization of the zoom of said first video camera and the movements of said mirror being controlled by said processor unit.

11. An apparatus as claimed in claim 10, characterized in that said first video camera is disposed with its axis parallel to the axis of said wire, in a position facing a mirror which reflects onto it the image of said light-emitting line.

12. An apparatus as claimed in claim 1 comprising:

a plurality of laser sources disposed side by side transverse to the axis of said wire and arranged to emit a plurality of substantially coplanar flat laser beams, a plurality of first video cameras disposed parallel to said laser sources, the coordinated operation of said first video cameras to measure the displacement of said wire about the longitudinal axis of the track being controlled by said processor unit.

13. An apparatus as claimed in claim 12, comprising a single mirror facing said plurality of side by side laser sources.

14. An apparatus as claimed in claim 1, further comprising a second video camera for the video inspection of the overhead line.

15. An apparatus as claimed in claim 14, wherein said second video camera for the video inspection of the overhead line is positioned to the side of said first video camera for determining said light-emitting line.

16. An apparatus as claimed in claim 14, wherein said first video camera or said second video camera is disposed with the optical axis parallel to the wire, facing a mirror arranged to reflect the image of said wire onto said first or second video camera.

17. An apparatus as claimed in claim 1, wherein said laser source and said first video camera are mounted in a container applied to the railway or tramway vehicle and provided with windows for the passage of said laser beam and of the image of said light-emitting line.

18. An apparatus as claimed in claim 17, wherein at least one cleaning brush and at least one detergent liquid sprayer are associated with each window.

19. An apparatus as claimed in claim 17, wherein in addition to said container, there is applied a triangulation device sighted on the rails to measure the movements of said vehicle relative thereto and to correct said acquired data on the basis of said movements.

* * * * *